W. R. WEBSTER.
STARTING MECHANISM FOR EXPLOSIVE ENGINES.
APPLICATION FILED OCT. 24, 1906.
905,611.
Patented Dec. 1, 1908.
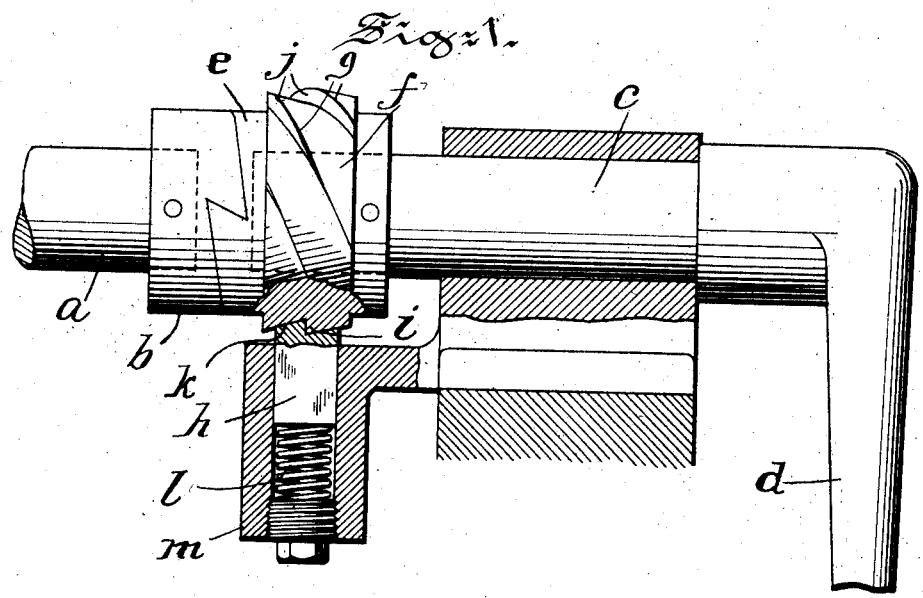
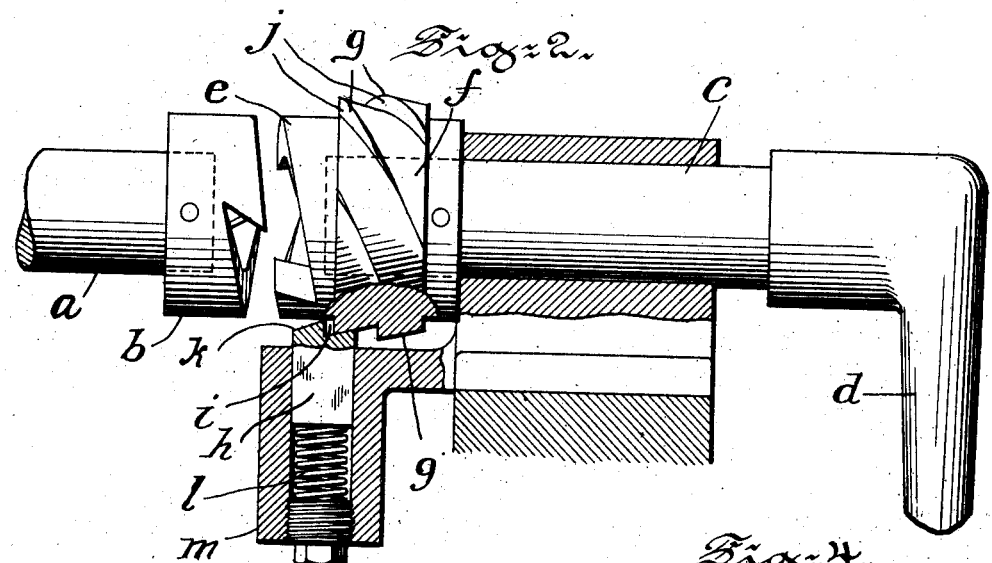
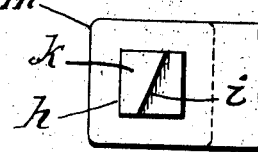
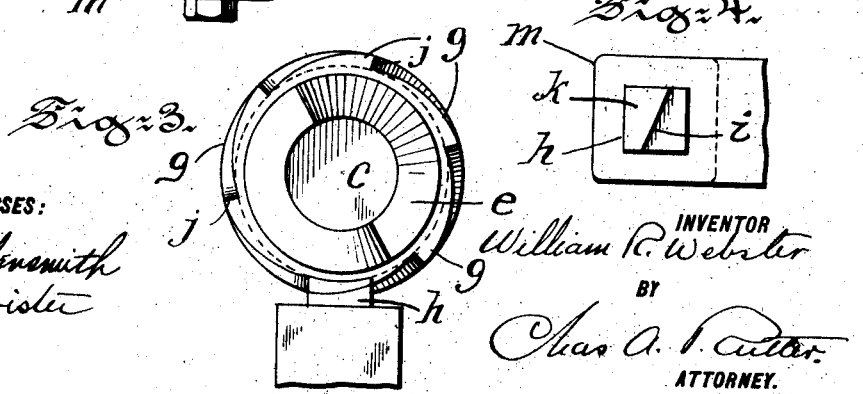
WITNESSES:
INVENTOR
William R. Webster
BY
Chas. A. V. Cutter
ATTORNEY.

UNITED STATES PATENT OFFICE.

WILLIAM R. WEBSTER, OF PHILADELPHIA, PENNSYLVANIA.

STARTING MECHANISM FOR EXPLOSIVE-ENGINES.

No. 905,611.     Specification of Letters Patent.     Patented Dec. 1, 1908.

Application filed October 24, 1906. Serial No. 340,261.

*To all whom it may concern:*

Be it known that I, WILLIAM R. WEBSTER, a citizen of the United States, and a resident of the city and county of Philadelphia, State of Pennsylvania, have invented certain new and useful Improvements in Starting Mechanism for Explosive-Engines, of which the following is a specification.

My invention relates to improvements in starting mechanism for explosive engines, and the object of my invention is to furnish a simple, efficient, and inexpensive means for starting the engine and for preventing accident to the operator from the "back kick" which sometimes takes place owing to an advanced spark or other well known causes.

In carrying out my invention I furnish the shaft of the starting crank with a gear wheel the teeth of which are inclined at an angle to the axis of this shaft; these teeth are, in fact, parts of screw threads, and I engage these teeth with a spring actuated detent having preferably an inclined engagement face. The shaft of the starting crank has a movement longitudinally and upon a movement of the starting crank and shaft to start the engine, the detent and the teeth upon the gear wheel, when fully engaged, serve to move the shaft to cause its clutch to engage the clutch upon the engine shaft, the detent yielding and permitting the teeth of the gear to pass it as the crank is turned to start the engine. If the engine "back kicks" the motion of the starting crank and its shaft and of the gear wheel is reversed but now the flat sides of the teeth of the gear engage the detent, hence as the reverse motion proceeds the crank shaft is moved away from the engine shaft and the clutches on these shafts unlocked.

The pitch of the thread like teeth of the gear wheel is such that a very small reverse movement of the engine serves to completely unlock the clutch and stop the reverse driving of the starting crank.

In the accompanying drawings forming part of this specification and in which similar letters of reference indicate similar parts through the several views: Figure 1, is a side elevation, partly in section, of my explosive engine starting means, the clutches on the engine and starting crank shafts being engaged. Fig. 2, a similar view, the clutches being disengaged; Fig. 3, an end elevation of the engaging face of the clutch on the starting crank; Fig. 4, a plan of detent and its carrying socket.

$a$ is part of the engine shaft of a gas engine, $b$ the clutch pinned or otherwise suitably secured to this shaft.

$c$ is the starting crank shaft and the starting crank of the engine, $e$ is the clutch carried by the crank shaft $c$ and adapted to engage with the clutch $b$ of the engine shaft to start the engine in the usual manner.

Rigidly secured to the shaft $c$ is a gear wheel $f$ the teeth $g$ of which are inclined as shown, that is, they form parts of screw threads. For simplicity and convenience the gear wheel $f$ is shown as formed upon the hub of the clutch $e$, it may be, however, a separate piece secured in any convenient manner to the shaft $c$.

$h$ is a detent adapted to engage the gear wheel $f$. This detent has preferably an inclined perpendicular face $i$, Fig. 4, adapted on a reverse movement of the gear $f$ to engage the perpendicular faces $j$ of the teeth $g$, and an inclined top $k$ to permit a riding over of the teeth on a forward movement of the gear wheel. The detent is held in a normally raised position by a spring $l$, Figs. 1 and 2, which is carried in a socket $m$ which in the present case is shown as part of the casting of the bearing which carries the shaft $c$.

The normal positions of the shafts and clutches is shown in Fig. 2. To start the engine the crank $d$ is drawn by the operator towards him turning the shaft $c$ to the right, the detent $h$ being in engagement with the gear $f$. This turning will cause the clutch $e$ to engage the clutch $b$ after which a further turning of the crank will rotate the shaft $a$ and start the engine. If the engine starts properly the revolution of shaft $a$ being faster than that of shaft $c$, which is dragged by the gear wheel and detent, will cause clutch $b$ to disengage and push away clutch $e$ when shaft $c$ and connected parts come to rest.

If the engine should back kick the clutch $b$ will cause a reverse movement of clutch $e$, gear wheel $f$ and shaft $c$, but as one of the teeth of the gear wheel $f$ is in engagement with detent $h$, this reverse movement will expend itself by causing the teeth of the gear wheel to pass along the detent separating the clutches more and more until they presently become disengaged. The disengagement of the clutches occurs before any considerable reverse movement is given to crank $d$ and as soon as they are disengaged the crank $d$ and connected parts come to rest. In practice the weight of the crank $d$ is sufficient to cause it, when not in use, to assume the position shown in Fig. 2, that is, to maintain the clutch $e$ in a position entirely out of engagement with clutch $b$. This arrangement of the detent may be considerably varied from that shown, any suitable detent or pawl may be employed.

Having thus described my invention, I claim as new and desire to secure by Letters Patent:—

1. In a starting mechanism of the class described, in combination an engine shaft, a clutch carried by said shaft, a starting crank shaft and crank, a clutch carried by said crank shaft, a cylindrical gear wheel having teeth forming parts of screw threads secured to said crank shaft, and a spring operated detent adapted to engage said teeth at all times, said gear wheel and detent operating upon a rotation of said crank shaft in one direction to engage the clutches carried by said crank and engine shafts, and upon a rotation of said engine shaft in the opposite direction to disengage said clutches.

2. In a starting mechanism of the class described, in combination, an engine shaft, a clutch carried by said shaft, a starting crank shaft and crank, a clutch carried by said crank shaft, a cylindrical gear wheel having teeth forming parts of screw threads secured to said shaft, a spring actuated detent adapted to engage said teeth at all times, and a socket formed integrally with the crank shaft bearing, for carrying said detent.

3. In a starting mechanism of the class described, in combination, an engine shaft, a clutch carried by said shaft, a starting crank shaft and crank, a clutch carried by said shaft, a bearing carrying said crank shaft, a gear wheel formed integrally with said clutch, the teeth of said gear being inclined to form screw threads, a spring actuated detent adapted to engage said teeth, and a socket formed integrally with the crank shaft bearing for carrying said detent.

WM. R. WEBSTER.

Witnesses:
 GEORGE W. SELTZER,
 CHARLES A. RUTTER.